(12) United States Patent
Tachibana

(10) Patent No.: US 8,954,746 B2
(45) Date of Patent: Feb. 10, 2015

(54) COMMUNICATION APPARATUS, AND METHOD FOR CONTROLLING COMMUNICATION APPARATUS

(75) Inventor: Hideaki Tachibana, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 398 days.

(21) Appl. No.: 12/574,094

(22) Filed: Oct. 6, 2009

(65) Prior Publication Data

US 2010/0095119 A1    Apr. 15, 2010

(30) Foreign Application Priority Data

Oct. 10, 2008 (JP) ................................ 2008-264633
Sep. 28, 2009 (JP) ................................ 2009-222840

(51) Int. Cl.
  *H04L 29/06* (2006.01)
  *H04L 9/08* (2006.01)
  *H04W 12/04* (2009.01)
  *H04W 84/22* (2009.01)

(52) U.S. Cl.
  CPC ............. *H04L 9/0841* (2013.01); *H04W 12/04* (2013.01); *H04L 9/0894* (2013.01); *H04W 84/22* (2013.01); *H04L 2209/60* (2013.01); *H04L 2209/80* (2013.01)
  USPC ........................... 713/189; 713/150; 380/359

(58) Field of Classification Search
  CPC ..... H04L 63/0428; H04L 9/00; H04L 9/0841; H04L 9/0894; G06F 12/1408; H04W 12/04; H04W 84/22
  See application file for complete search history.

(56) References Cited

U.S. PATENT DOCUMENTS

2007/0008922 A1* 1/2007 Abhishek et al. ............. 370/329
2009/0128634 A1* 5/2009 Miura et al. ............... 348/207.1

FOREIGN PATENT DOCUMENTS

| JP | 2000-138703 | 5/2000 |
| JP | 2007020717 A | 2/2007 |
| JP | 2007-251748 | 9/2007 |
| JP | 2008060704 A | 3/2008 |

OTHER PUBLICATIONS

Wi-Fi Certified™ for Wi-Fi Protected Setup Easing the User Experience for Home and Small Office Wi-Fi® Networks, http://www.wi-fi-org/files/kc/200090123_Wi-Fi_Protected_Setup.pdf.
JP OA Issued in Counterpart Japanese Application No. 2009-222840 dated Nov. 25, 2013.

* cited by examiner

*Primary Examiner* — Izunna Okeke
(74) *Attorney, Agent, or Firm* — Fitzpatrick, Cella, Harper & Scinto

(57) ABSTRACT

A communication apparatus is provided that encrypts content data that is to be uploaded to a server by using a first encryption key used in a process for sharing a communication parameter for communicating with other communication apparatus via a wireless network or a second encryption key based on the communication parameter shared in the sharing process. Consequently, the content data can be viewed only by a specific communication apparatus.

11 Claims, 12 Drawing Sheets

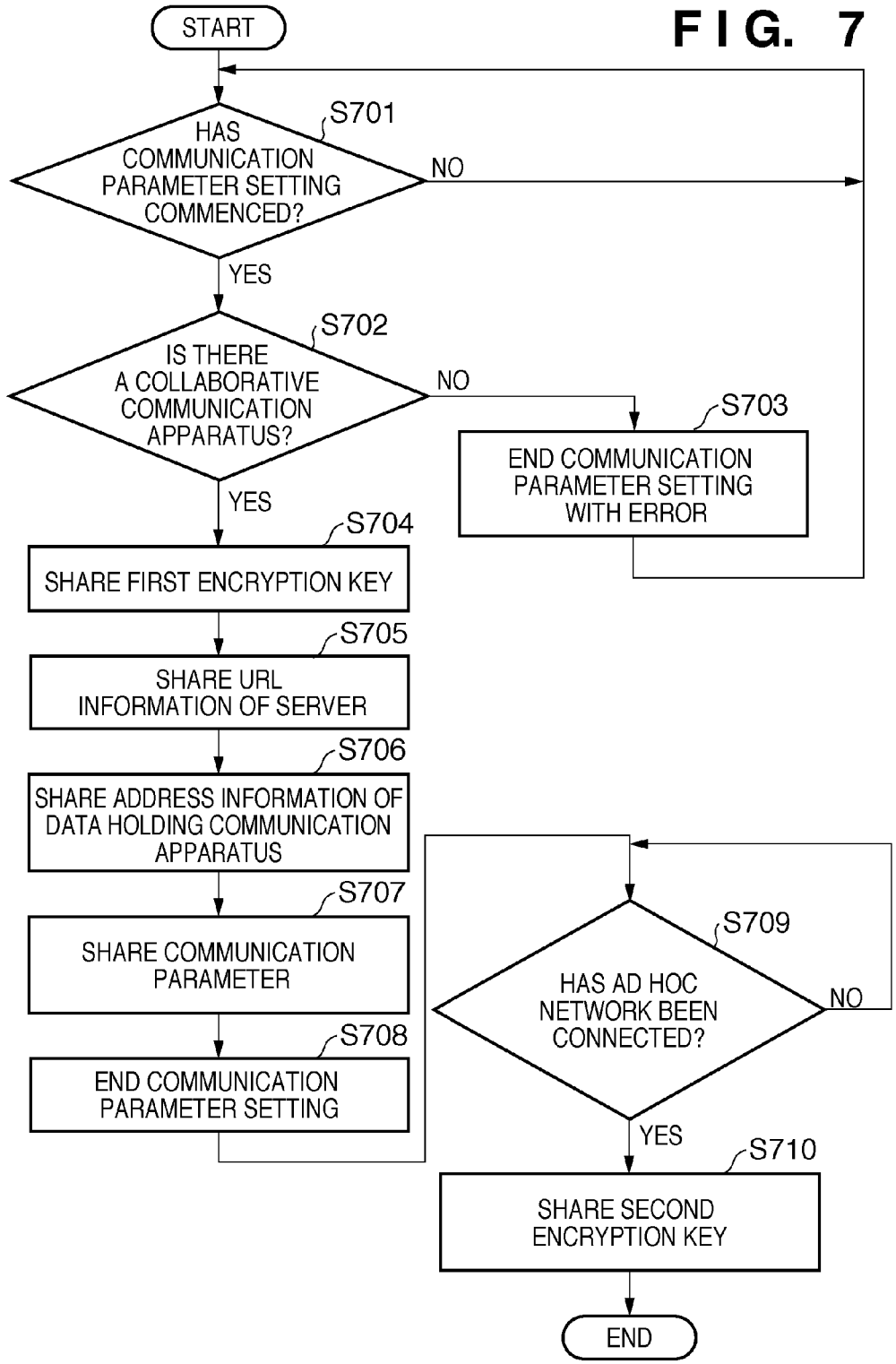

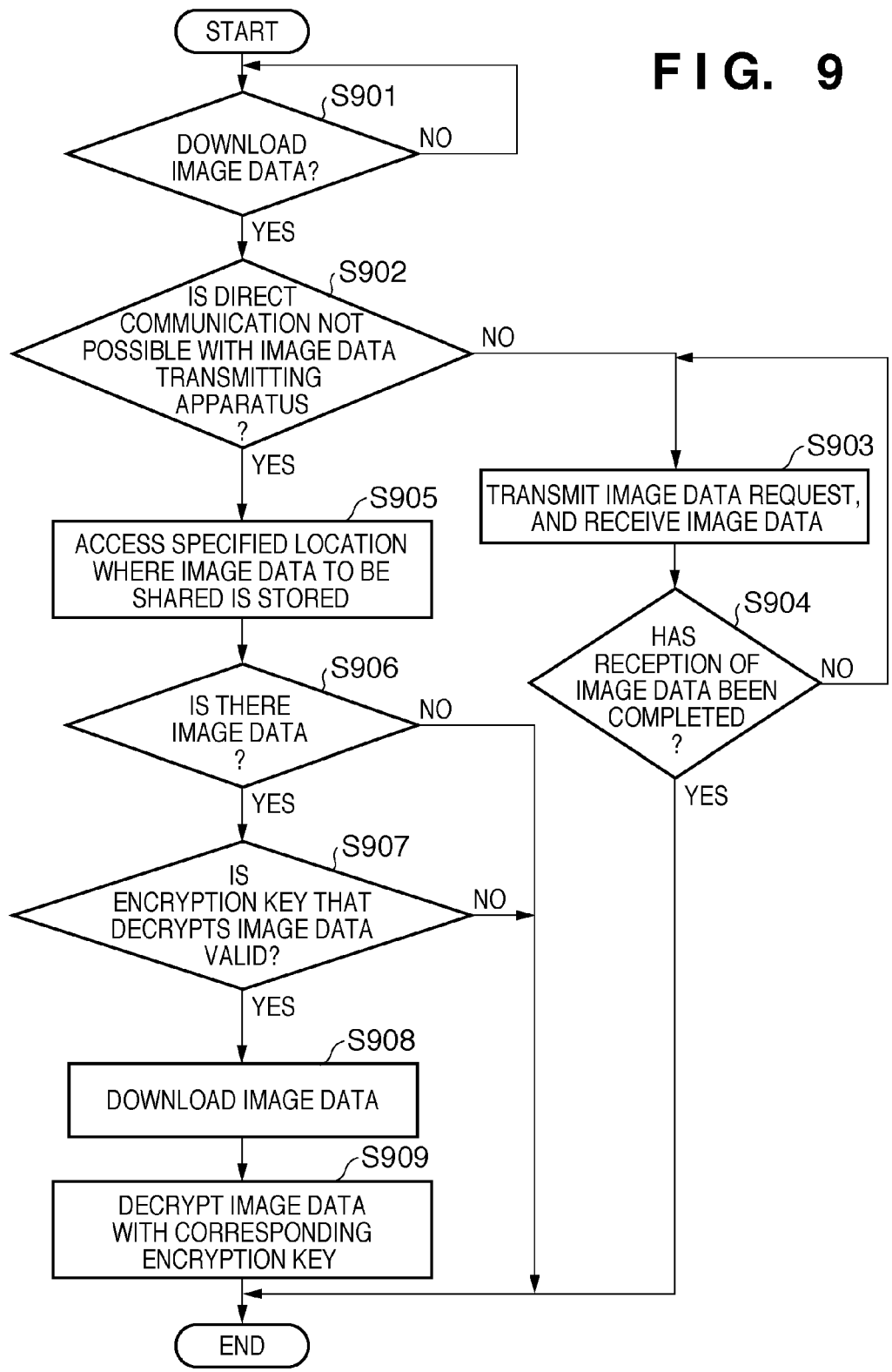

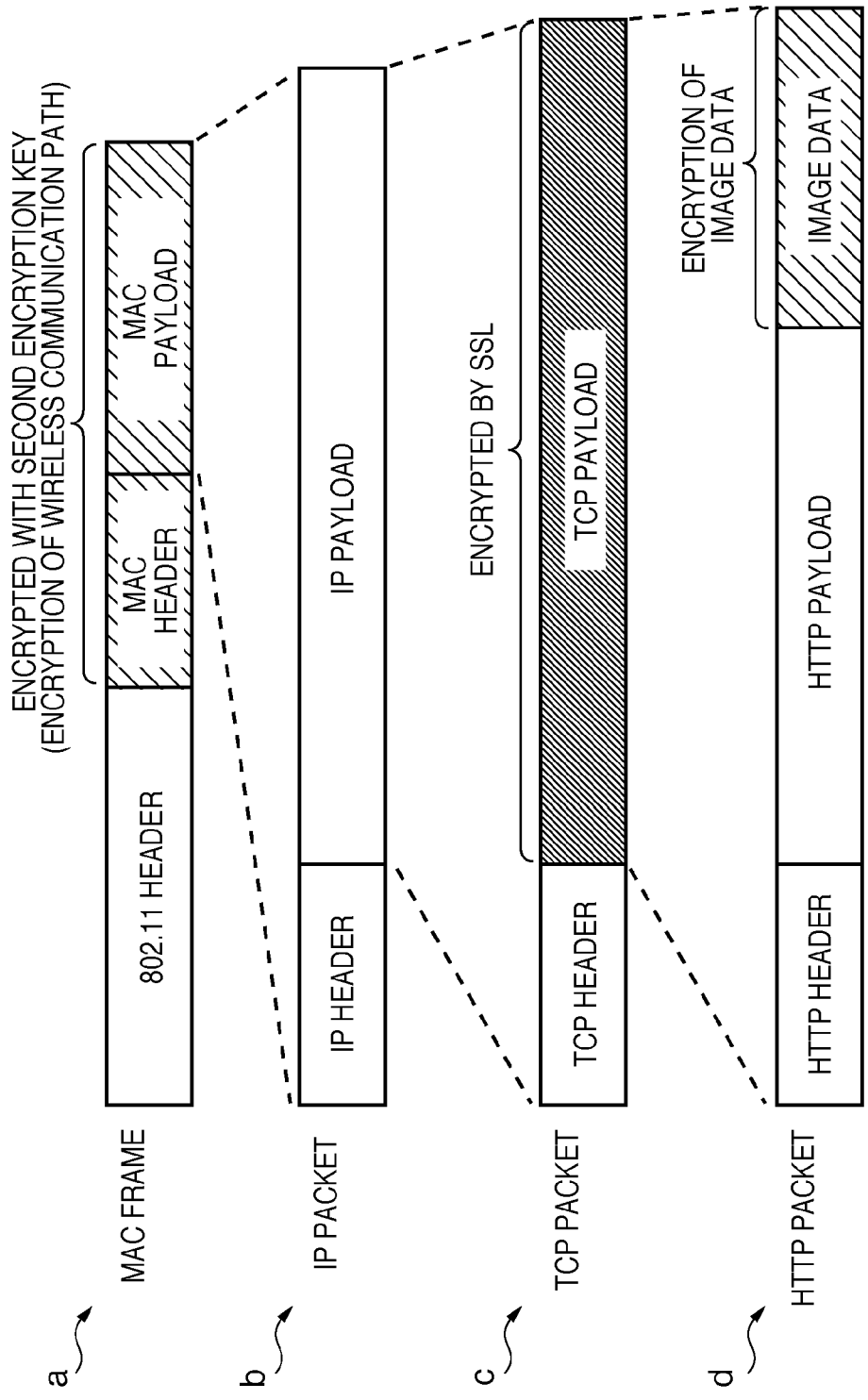

COMMUNICATION APPARATUS, AND METHOD FOR CONTROLLING COMMUNICATION APPARATUS

BACKGROUND OF THE INVENTION

1. Field of the Invention

The present invention relates to a communication apparatus, and a method for controlling a communication apparatus.

2. Description of the Related Art

There are services that let a user upload image data captured by a camera via a public network so as to allow people to view the image (see Japanese Patent Laid-Open No. 2007-251748). Meanwhile, there is a technique as disclosed in Japanese Patent Laid-Open No. 2000-138703 in which content data to be transmitted to an open network is encrypted whereas content data to be transmitted to a network that restricts user access is not encrypted.

Also, there is a communication parameter setting technique for allowing a plurality of communication apparatuses to easily share a communication parameter used to configure an IEEE 802.11 wireless LAN network (hereinafter referred to as a wireless LAN). The communication parameter includes an SSID that is network identification information, a frequency channel, an encryption key, an encryption scheme, an authentication scheme, and so on. The communication parameter setting technique has already been standardized (Wi-Fi CERTIFIED™ for Wi-Fi Protected Setup Easing the User Experience for Home and Small Office Wi-Fi (R) Networks, http://www.wi-fi.org/files/kc/20090123_Wi-Fi_Protected Setup.pdf, hereinafter referred to as WPS), and has been applied to many communication apparatuses.

With the WPS communication parameter setting process, a communication parameter is provided from one communication apparatus to another communication apparatus by using a specific protocol. When transmitting or receiving a communication parameter, a first encryption key that is shared between the communication apparatuses by the Diffie-Hellman key exchange algorithm is used. The first encryption key is discarded when the communication parameter has been set or when the expiration time is reached.

When carrying out wireless communication via a wireless network configured with the shared communication parameter, a second encryption key based on the communication parameter is used. The second encryption key is discarded when the wireless network is disconnected after desired communication ends, or when the expiration time is reached.

SUMMARY OF THE INVENTION

In the case where a communication apparatus connects to a public network so as to upload content data, such as image data, to a server or the like on the network, a communication path of a higher layer than the IP layer is sometimes encrypted by SSL or the like. In such a case, however, it is often the case that the content data itself is not encrypted, and because the communication path is temporarily terminated by a proxy server or the like, there is a possibility that the data may be intrusively viewed on the server side.

The present invention improves security when providing content data to another communication apparatus.

In order to solve the above problems, one aspect of the present invention provides a communication apparatus comprising, a sharing unit configured to share a communication parameter for communicating with other communication apparatus via a wireless network, a storage unit configured to store at least one of a first encryption key used by the sharing unit to share the communication parameter and a second encryption key based on the communication parameter shared by the sharing unit, an encryption unit configured to encrypt content data that is to be shared with the other communication apparatus by using the first encryption key or the second encryption key that are stored in the storage unit, and a transmitting unit configured to transmit the content data encrypted by the encryption unit to an external apparatus.

In order to solve the above problems, another aspect of the present invention provides a communication apparatus comprising a sharing unit configured to share a communication parameter for communicating with other communication apparatus via a wireless network, a storage unit configured to store at least one of a first encryption key used by the sharing unit to share the communication parameter and a second encryption key based on the communication parameter shared by the sharing unit, a receiving unit configured to receive encrypted content data that is stored in an external apparatus, and a decryption unit configured to decrypt the content data received by the receiving unit by using the first encryption key or the second encryption key that are stored in the storage unit.

Further features of the present invention will become apparent from the following description of exemplary embodiments with reference to the attached drawings.

BRIEF DESCRIPTION OF THE DRAWINGS

FIG. 7 is a flowchart showing an example of a process performed by a communication apparatus 601-1 according to Embodiment 2 of the present invention.

FIG. 9 is a flowchart showing an example of an operation of a communication apparatus 601-2 or 601-3 according to Embodiment 2 of the present invention.

FIG. 10 is a diagram used to illustrate a range to be encrypted in Embodiments 1 and 2 of the present invention.

DESCRIPTION OF THE EMBODIMENTS

Hereinafter, embodiments of the present invention will be described with reference to the accompanying drawings.

Embodiment 1

In the present embodiment, a data sharing system will be described in which a plurality of communication apparatuses transmit and receive content data that needs to be shared via a proxy server. It should be noted, however, that the embodiment of the present invention is not limited to systems that include a proxy server, and is also applicable to an email system in which content data is transmitted and received via an email server and a document system in which content data is transmitted and received via a document server.

Figure 1:
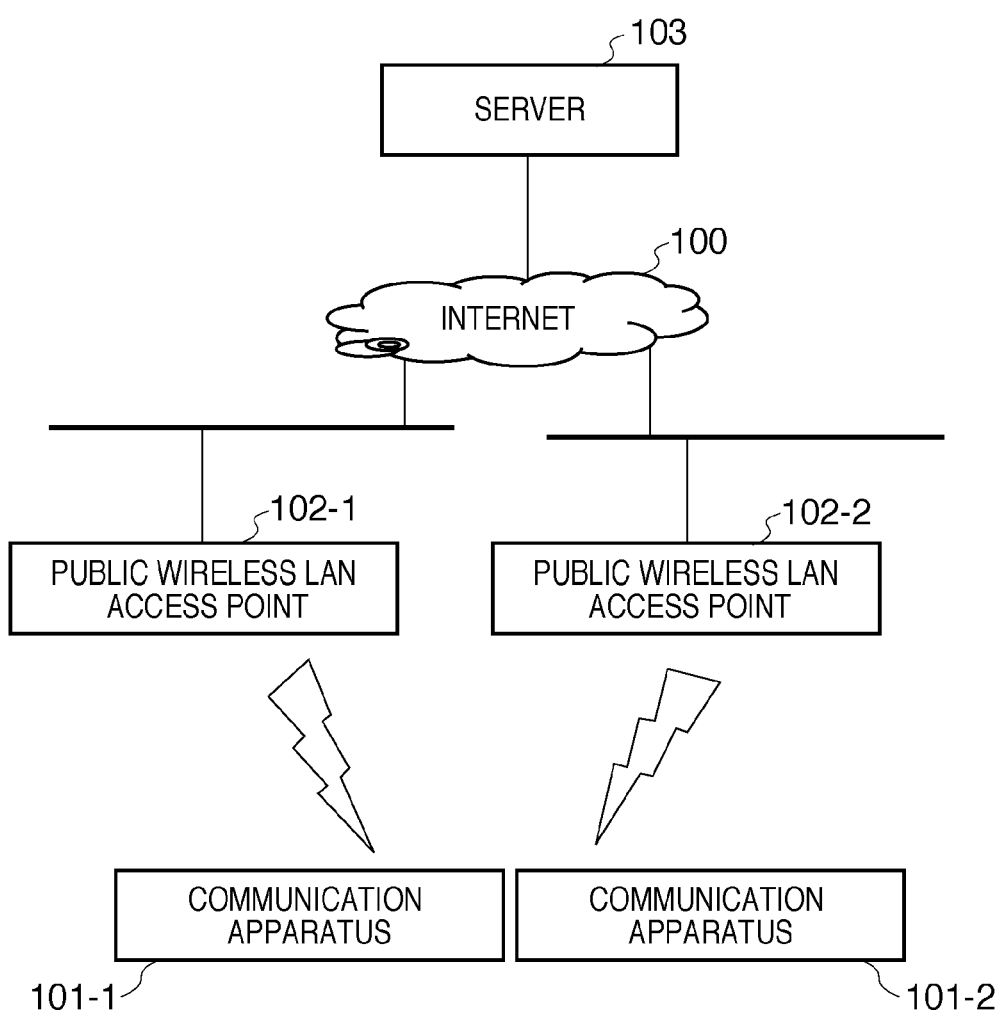
FIG. 1 is a diagram showing an example of a configuration of a data sharing system according to Embodiment 1 of the present invention.

FIG. 1 is a diagram showing an example of a configuration of a data sharing system according to Embodiment 1 of the present invention. An internet 100 is an external network that enables communication between nodes in accordance with TCP/IP protocols. The internet 100 is not limited to the Internet, and can be a WAN (Wide Area Network), a LAN (Local Area Network), or a combination thereof.

A communication apparatus 101-1 and a communication apparatus 101-2 have an IEEE 802.11 wireless LAN (hereinafter referred to as wireless LAN) communication function. The communication apparatus 101-1 and the communication apparatus 101-2 are capable of infrastructure-mode wireless communication via a public wireless LAN access point (hereinafter referred to as an access point) 102-1 or 102-2. The communication apparatus 101-1 and the communication apparatus 101-2 are also capable of ad hoc mode wireless communication in which communication is directly performed without involving access points. Hereinafter, a plurality of communication apparatuses are collectively referred to as communication apparatuses 101, and a plurality of access points are collectively referred to as access points 102. Each communication apparatus 101 has an automatic communication parameter setting function to configure a wireless network. The communication apparatus 101-1 is assumed to have the authority to connect to the access point 102-1, and store a communication parameter for connecting to the infrastructure-mode wireless network formed by the access point 102-1. The communication apparatus 101-2 is assumed to have the authority to connect to the access point 102-2 and store a communication parameter for connecting to the infrastructure-mode wireless network formed by the access point 102-2. However, the number of communication apparatuses 101 is not limited to two as shown in FIG. 1, and more communication apparatuses may be connected to the access points. In such a case, it is needless to say that each communication apparatus can connect to any access point as long as it has the authority, and the same results can be obtained.

The access points 102 are access points that are connected to the internet 100. The access points 102 provide a wireless LAN communication connection function to each communication apparatus. The number of access points 102 is not limited to the two points 1-2-1 and 102-2 as shown in FIG. 1, and more access points may be connected to the internet 100.

A server 103 is a server apparatus that is connected to the internet 100 and that stores content data, such as image data, transmitted from the communication apparatuses 101 via the internet 100.

Figure 2:
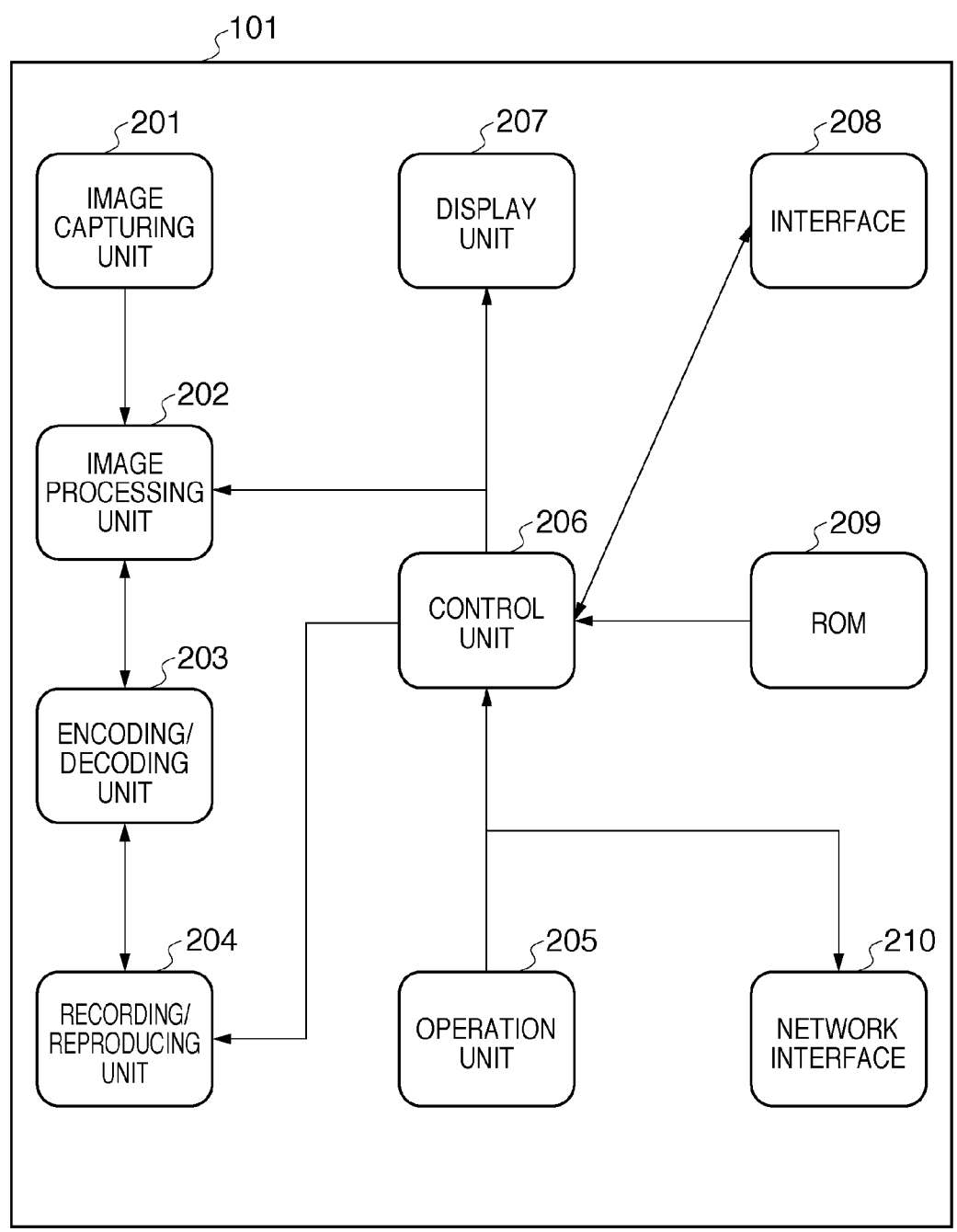
FIG. 2 is a block diagram showing an example of a hardware configuration of a communication apparatus according to an embodiment of the present invention.

An example of a hardware configuration of the communication apparatus according to the present embodiment will be described with reference to FIG. 2. FIG. 2 is a block diagram showing an example of a hardware configuration of the communication apparatus according to the present embodiment.

In the present embodiment, a description is given in the context of the communication apparatus 101 being a digital camera, but the same effects can be obtained as long as a device with a wireless LAN communication function is used. It is possible to use, for example, a personal computer (PC), a cell phone, or a PDA (Personal Digital Assistant) that has a wireless LAN communication function.

In FIG. 2, the communication apparatus 101 includes the following constituent elements. An image capturing unit 201 is an image capturing unit that captures an optical image of an object, and includes an image sensor such as a CCD or CMOS. An image processing unit 202 converts a captured image output from the image capturing unit 201 into image data of a prescribed format, and adds digital watermark to the image data.

An encoding/decoding unit 203 performs prescribed high efficiency encoding (e.g., DCT transform or variable length encoding after quantization) on the image data output from the image processing unit 202. The encoding/decoding unit 203 also expands and decodes compressed image data reproduced from a recording/reproducing unit 204, and supplies the image data to the image processing unit 202.

The recording/reproducing unit 204 records compression-encoded image data into a recording medium (not shown) attached to the communication apparatus 101 as well as reading and reproducing the image data. An operation unit 205 is a user interface for receiving instructions for the processing operations of the communication apparatus 101 from the user. A control unit 206 includes a microcomputer and a memory that is capable of storing prescribed program code, and controls the operations of the processing units that constitute the communication apparatus 101 so as to perform a process for a UPnP device or the like. A display unit 207 displays images captured by the image capturing unit 201 on an EVF (Electronic View Finder), a liquid crystal panel or the like. An interface 208 is a communication interface for transmitting image data or the like captured by the image capturing unit 201 to an external apparatus.

A ROM 209 is a storage apparatus that stores information on the functions of the communication apparatus 101. The communication apparatus of the present embodiment employs, for example, the JPEG (Joint Photographic Experts Group) compression-encoding scheme as a technique for encoding image data. A network interface (NETIF) 210 is an interface for carrying out wireless LAN communication that controls data transfer via a wireless network and diagnoses the status of a connection with a wireless network.

Figure 3:
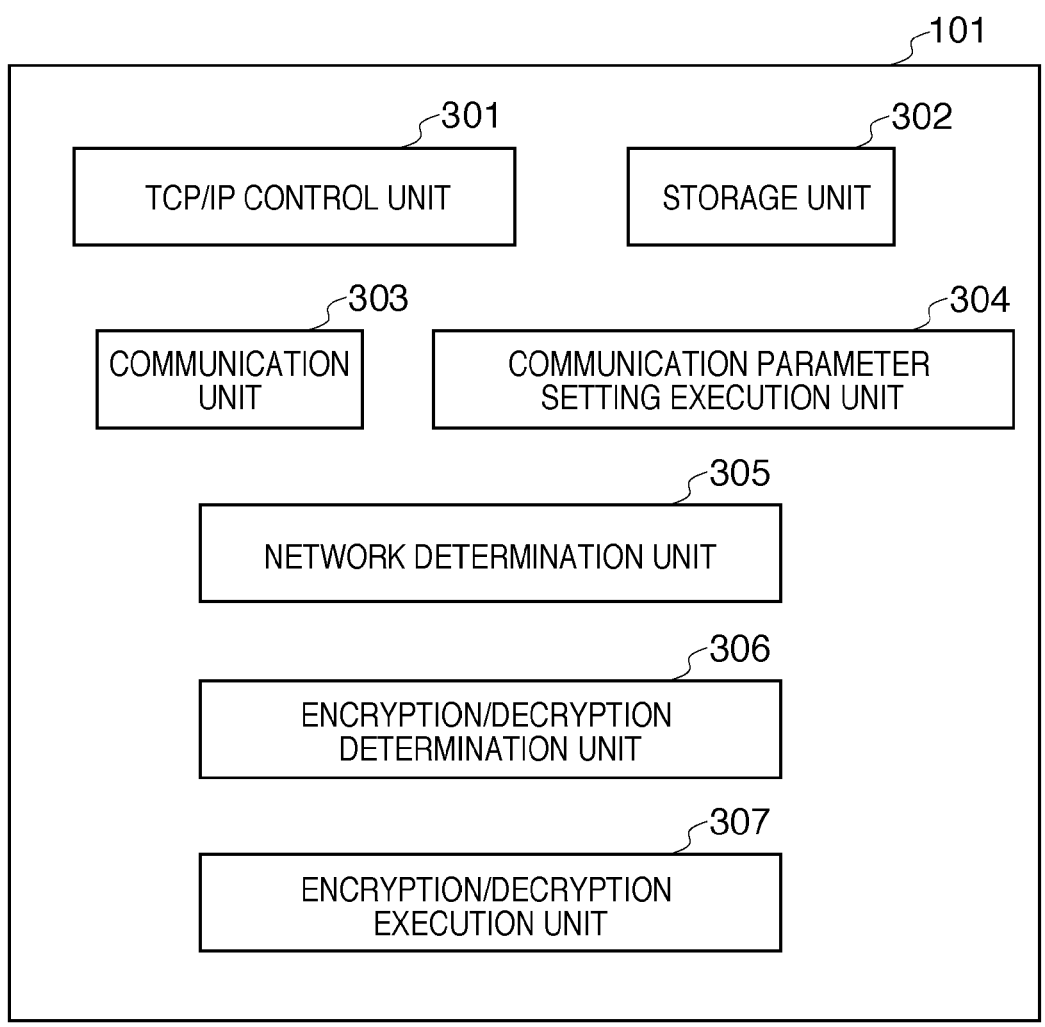
FIG. 3 is a diagram illustrating an example of a functional module configuration of a communication apparatus 101 according to an embodiment of the present invention.

Next, a functional module configuration of the communication apparatus 101 according to the present embodiment will be described with reference to FIG. 3. FIG. 3 is a diagram showing an example of a functional module configuration of the communication apparatus 101 according to the present embodiment. In the present embodiment, each module of the communication apparatus 101 is implemented by the control unit 206 executing a program stored in the ROM 209 so as to control each hardware block. However, all of the functional modules shown in FIG. 3 are not necessarily implemented as software modules, and some or all of the functional modules may be implemented as hardware modules.

A TCP/IP control unit 301 is a control module that performs TCP/IP protocol processes. A storage unit 302 stores an encryption key, a communication parameter necessary for configuring a wireless network that has been acquired by the automatic communication parameter setting function, server URL information, the data holding communication apparatus's address information, and so on. The communication parameter includes an SSID that is network identification information, a frequency channel, an encryption scheme, an authentication scheme, and so on. As used herein, the data holding communication apparatus refers to a communication apparatus that holds content data shared between the communication apparatus 101-1 and the communication apparatus 101-2.

A communication unit 303 carries out communication in accordance with communication protocols. A communication parameter setting execution unit 304 encrypts a communication parameter necessary to configure a wireless network with a collaborative communication apparatus to transmit and receive the parameter. In the present embodiment, it is assumed that information for identifying a server or a data holding apparatus is transmitted and received together with a communication parameter. A network determination unit 305 determines the type of network in which the communication apparatus 101 is participating from among an ad hoc type, an infrastructure type and a public network type, and makes a determination regarding a communication apparatus within the network. An encryption/decryption determination unit 306 determines whether or not to encrypt or decrypt content data based on the result of a determination made by the network determination unit 305. The encryption/decryption determination unit 306 also determines which encryption key is to be used for encryption and decryption from among the encryption keys stored in the storage unit 302. An encryption/decryption execution unit 307 encrypts and decrypts content data based on the result of a determination made by the encryption/decryption determination unit 306.

Next, an overview of a process according to the present embodiment will be described. In the present embodiment, first, automatic communication parameter setting for forming an ad hoc network between the communication apparatus 101-1 and the communication apparatus 101-2 is performed. In such automatic setting, the server 103 information is also shared between the communication apparatus 101-1 and the communication apparatus 101-2. After that, the communication apparatus 101-1 connects to the access point 102-1 so as to upload (transmit) image data to the server 103 via the internet 100. Then, the communication apparatus 101-2 connects to the access point 102-2 so as to download (receive) image data on the server 103 via the internet 100. It is also possible to adopt a configuration in which the communication apparatus 101-2 uploads image data to the server 103 and the communication apparatus 101-1 receives image data from the server 103.

In the present embodiment, an example will be described in which WPS (Wi-Fi Protected Setup) is applied to an ad hoc mode in the communication parameter setting process. In addition, in the present embodiment, a description will be given in the context in which the communication apparatus 101 is connected to the internet 100 by being connected to the access point 102, but the communication apparatus 101 may be connected to the internet 100 via a public network such as a cell phone network.

Figure 4A:
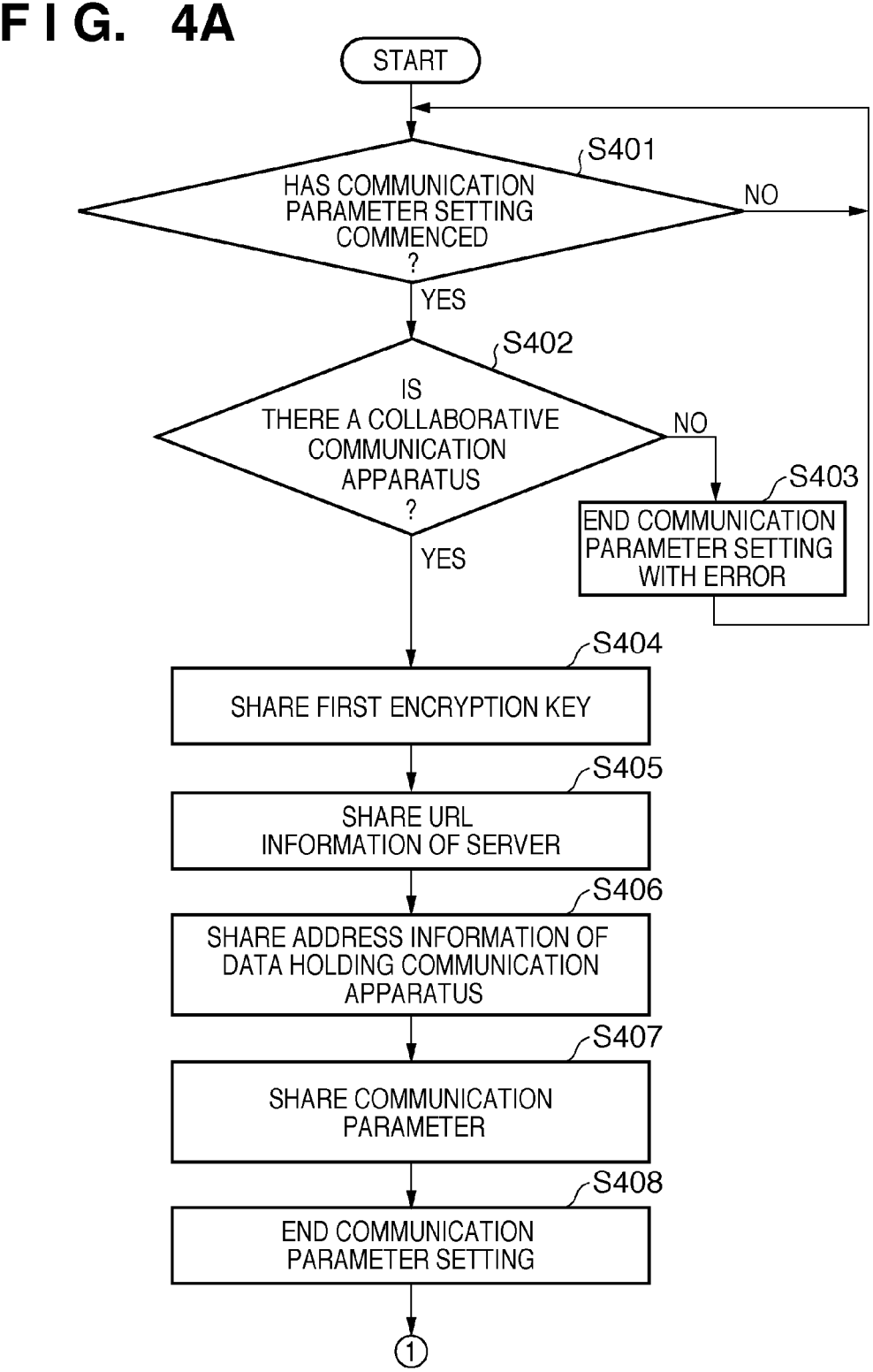
FIGS. 4A and 4B are flowcharts showing an example of a process performed by a communication apparatus 101-1 according to Embodiment 1 of the present invention.
Figure 4B:
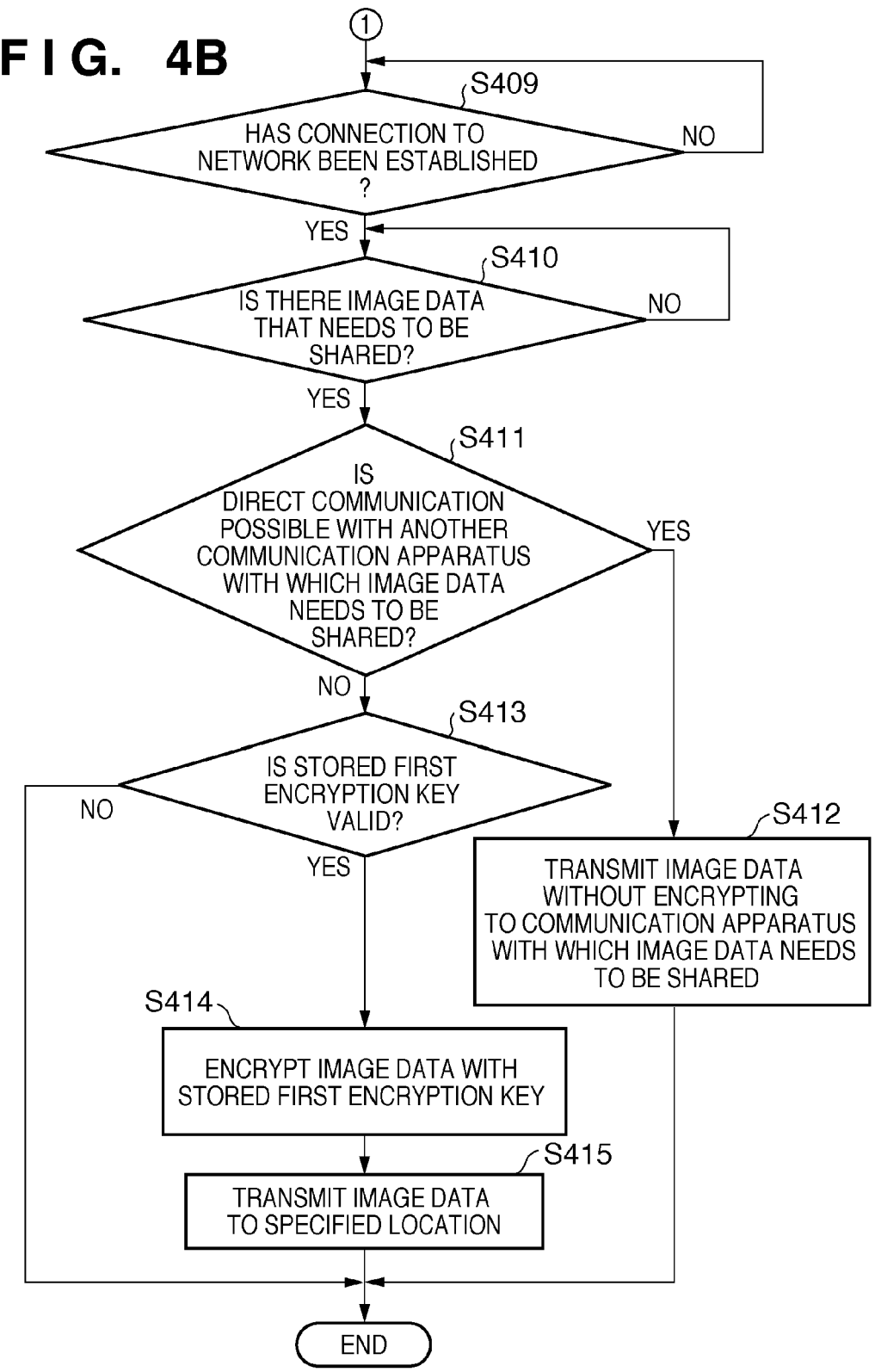

Next, an example of a process performed by the communication apparatus 101 according to the present embodiment will be described with reference to FIGS. 4A and 4B. More particularly, here, a process performed by the communication apparatus 101-1, which is an image data transmitting side apparatus, will be described. FIGS. 4A and 4B are flowcharts showing an example of a process performed by the communication apparatus 101-1 according to the present embodiment.

In Step S401, the communication apparatus 101-1 determines whether or not a communication parameter setting process has commenced. In the present embodiment, whether or not WPS has commenced is determined. Next, in Step S402, the communication apparatus 101-1 determines whether or not there is a collaborative communication apparatus with which communication parameter setting is to be performed. In this example, because the communication apparatus 101-1 is an apparatus that executes this process, the communication apparatus 101-2 is a collaborative communication apparatus. In Step S402, the presence or absence of a collaborative communication apparatus can be determined by, for example, determining whether or not a beacon that includes information indicating that WPS is being activated has been received. It is also possible to determine the presence or absence of a collaborative communication apparatus by transmitting a probe request and determining whether or not a probe response that includes information indicating that WPS is activated has been received.

If the communication apparatus 101-2 is not found ("NO" in Step S402), the communication apparatus 101-1 informs the user that the communication apparatus 101-2 was not found by means of a UI or the like. Then, in Step S403, the communication parameter setting process ends with an error. When the communication parameter setting process ends with an error, the communication apparatus 101-1 returns to the initial state of Step S401.

If, on the other hand, the collaborative communication apparatus 101-2 is found ("YES" in Step S402), the procedure advances to Step S404. In Step S404, the communication apparatus 101-1 shares a first encryption key with the collaborative communication apparatus 101-2. Specifically, the first encryption key is shared by using the Diffie-Hellman key exchange algorithm. Here, the first encryption key is used for encryption and decryption when transmitting and receiving a variety of information, such as a communication parameter, in the communication parameter setting process.

Subsequently, in Step S405, the communication apparatus 101-1 shares the URL information, IP address and the like of the server 103 with the communication apparatus 101-2. In the present embodiment, because image data is shared by placing the image data on the server 103, the URL information, IP address and the like of the server 103 are acquired. In the case where content data is shared via a data holding communication apparatus rather than the server 103, in Step S406, the address information (URL, IP address, etc.) of the data holding communication apparatus is shared.

In Step S407, the communication apparatus 101-1 shares a communication parameter necessary to configure a wireless network with the communication apparatus 101-2. When a variety of information on a URL, a data holding communication apparatus, a communication parameter and so on is shared in Steps S405 to S407, the information is encrypted and decrypted with the first encryption key. In this example, Steps S405 to 407 were described as separate processes, but they may be performed collectively. That is, it is possible to store information on a URL, a data holding communication apparatus, a communication parameter and so on in a single frame, and transmit and receive the frame. In addition, the information on a URL and a data holding communication apparatus is not necessarily shared in the communication parameter setting process, and such information may be pre-stored in the communication apparatus 101-1 and the communication apparatus 101-2. The first encryption key, the communication parameter, the URL of the server 103, the address information of the data holding communication apparatus, and the like shared between the communication apparatuses 101 in the above process are stored in the storage unit 302. Subsequently, in Step S408, the communication apparatus 101-1 ends the communication parameter setting process.

Subsequently, in Step S409, the communication apparatus 101-1 determines whether or not it has connected to a network based on the network determination unit 305. In the present embodiment, the communication apparatus 101-1 connects to the wireless network formed by the access point 102-1 or establishes a wireless network connection with the communication apparatus 101-2. If a network connection is found ("YES" in Step S409), the procedure advances to Step S410. In Step S410, the communication apparatus 101-1 determines whether or not there is image data that needs to be shared with the communication apparatus 101-2. Such a determination can be made, for example, by a user selection or based on the fact that new image data has been added to the communication apparatus 101-1.

In Step S411, the communication apparatus 101-1 determines whether or not direct communication is possible with the communication apparatus 101-2 with which image data needs to be shared. Whether or not direct communication is possible can be determined by performing a detection process at the MAC layer within the network in which the communication apparatus 101-1 resides to detect whether or not it is possible to discover a communication apparatus with which image data needs to be shared. In the present embodiment, if the communication apparatus 101-1 is connected to a wireless network that employs a communication parameter shared in the communication parameter setting process, it is determined that direct communication is possible. That is, if the communication apparatus 101-1 has an ad hoc network connection with the communication apparatus 101-2, it is determined that direct communication is possible. If the communication apparatus 101-1 is connected to the access point 102-1, it is determined that direct communication is not possible.

Encryption performed according to the present embodiment will now be described in detail. When ad hoc mode wireless communication is performed between the communication apparatus 101-1 and the communication apparatus 101-2, a communication parameter shared by WPS is used. The encryption key used for the wireless communication is roughly classified into two types according to the encryption scheme. The first one is a method that employs an encryption key included in the communication parameter shared by WPS. The second one is a method that employs a session key and a group key that are newly generated based on the encryption key included in the shared communication parameter by performing an authentication process between the communication apparatuses. As used herein, the session key refers to an encryption key that is used when carrying out unicast communication with a specific partner apparatus and that is common between the two communication apparatuses. On the other hand, the group key refers to an encryption key that is used when carrying out multicast communication with a plurality of communication partners and that is common among all of the communication apparatuses that configure a wireless network. In the present embodiment, the encryption keys used in the first and second methods are collectively described as second encryption keys.

Next, a range to be encrypted when transmitting image data according to the present embodiment will be described with reference to FIG. 10. FIGS. 10(*a*) to 10(*d*) show a MAC frame, an IP packet, a TCP packet and an HTTP packet, respectively. In the case where ad hoc mode wireless communication is performed between the communication apparatus 101-1 and the communication apparatus 101-2, as shown in FIG. 10(*a*), a MAC header and a MAC payload are encrypted with the second encryption key. In the present embodiment, when the MAC header and the MAC payload are encrypted, it is referred to as "encryption of a wireless communication path". Likewise, "encryption of content data (image data)" refers to the situation when only content data (image data) that is a part of an HTTP payload is encrypted as shown in FIG. 10 (*d*). "Encryption by SSL" refers to the situation when only a TCP payload is encrypted as shown in FIG. 10 (*c*).

As just described, the encryption of a wireless communication path, the encryption of content data and encryption by SSL are all independent processes rather than a single process. As such, for example, the encryption of a wireless communication path can be performed regardless of whether or not content data has been encrypted. Likewise, content data can be encrypted regardless of whether or not the wireless communication path has been encrypted.

Returning to the description of FIGS. 4A and 4B, if it is determined that direct communication is possible with the communication apparatus 101-2 ("YES" in Step S411), the procedure advances to Step S412.

When direct wireless communication is performed in an ad hoc mode between the communication apparatus 101-1 and the communication apparatus 101-2, the wireless communication path is encrypted by using the second encryption key as described above. Accordingly, security is secured even if the image data itself is not encrypted. Thus, in Step S412, the communication apparatus 101-1 transmits image data to the communication apparatus 101-2 without encrypting the data.

If, on the other hand, the communication apparatus 101-1 determines that direct communication is not possible with the communication apparatus 101-2 ("NO" in Step S411), the communication apparatus 101-1 encrypts the image data with the first encryption key and performs communication. That is, when direct communication is not possible, the wireless communication path is not encrypted with the second encryption key, so the image data is encrypted to secure security.

As described above, the communication apparatus 101-1 switches between whether or not to encrypt content data by using the first encryption key according to whether or not the content data receiving apparatus has been connected to the wireless network configured with the shared communication parameter.

In Step S413, the communication apparatus 101-1 determines whether or not the first encryption key shared with the communication apparatus 101-2 in the communication parameter setting process is valid. As used herein, "valid" means that the key can be used (the key is not discarded, or in other words, it is the correct encryption key).

If the first encryption key is invalid ("NO" in Step S413), the process ends. At this time, the communication apparatus 101-1 informs the user of the error by means of a UI or the like. If, on the other hand, the first encryption key is valid ("YES" in Step S413), the procedure advances to Step S414, where the communication apparatus 101-1 encrypts the image data with the first encryption key.

As described above, in the present embodiment, the first encryption key used to transmit and receive a communication parameter in the communication parameter setting process is also used to encrypt content data itself when transmitting the content data. When encrypting content data, it is not necessary to encrypt a communication path at an upper layer by SSL or the like, but if tighter security is necessary, the communication path at an upper layer may be encrypted. Whether or not to encrypt the communication path at an upper layer may be selectively switched by the user depending on which of communication speed or security is more important.

In Step S415, the communication apparatus 101-1 transmits the image data that has been encrypted with the first encryption key to the server 103 based on the URL and IP address information and the like of the server 103. At this time, in order to enable a determination as to whether or not the communication apparatus 101-2 can decrypt the image data transmitted to the server 103, the data frame may be associated with the identification information of an encryption key with which decryption is possible.

Figure 5:
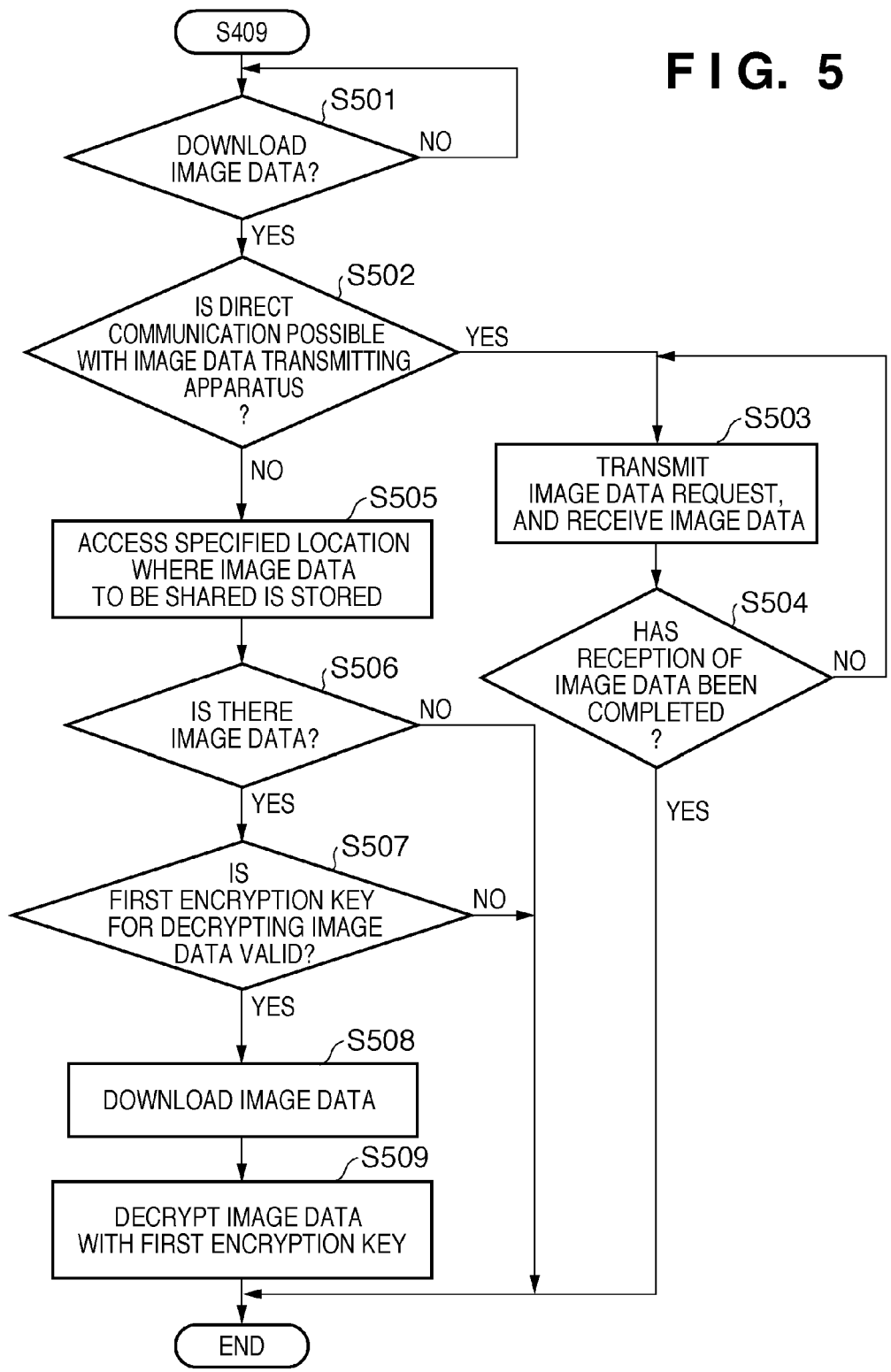
FIG. 5 is a flowchart showing an example of a process performed by a communication apparatus 101-2 according to Embodiment 1 of the present invention.

Next, an example of a process performed by the communication apparatus 101-2 according to the present embodiment will be described with reference to FIG. 5. FIG. 5 is a flowchart showing an example of a process performed by the communication apparatus 101-2 of the present embodiment.

In FIG. 5, the processes before Step S501 are the same as those of Steps S401 to S409 of FIGS. 4A and 4B, so a description thereof is omitted here.

If the communication apparatus 101-2 confirms in Step S409 that it has connected to a network, the procedure advances to Step S501. In Step S501, the communication apparatus 101-2 determines whether or not to download the image data based on an instruction from the user. If the user wants to download the data ("YES" in Step S501), the procedure advances to Step S502.

In Step S502, the communication apparatus 101-2 determines whether or not direct communication is possible with the data transmitting apparatus. In the present embodiment, the data transmitting apparatus is the communication apparatus 101-1. Whether or not direct communication is possible can be determined by performing a detection process at the MAC layer within the network in which the communication apparatus 101-2 resides to detect whether or not it is possible to discover a data transmitting apparatus (the communication apparatus 101-1). In the present embodiment, if the communication apparatus 101-2 is connected to a wireless network that employs a communication parameter shared in the communication parameter setting process, it is determined that direct communication is possible. That is, if the communication apparatus 101-2 has an ad hoc network connection with the communication apparatus 101-1, it is determined that direct communication is possible. If the communication apparatus 101-2 is connected to the access point 102-2, it is determined that direct communication is not possible.

If direct communication is possible ("YES" in Step S502), the procedure advances to Step S503. In Step S503, the communication apparatus 101-2 transmits an image data request to the data transmitting apparatus (the communication apparatus 101-1) and receives the image data. Subsequently, in Step S504, the communication apparatus 101-2 determines whether or not the reception of image data from the data transmitting apparatus (the communication apparatus 101-1) has been completed. If the reception of image data has been completed ("YES" in Step S504), the process ends. As described above, when direct communication is carried out, the wireless communication path is encrypted with a second encryption key, and the image data itself is not encrypted. Accordingly, the communication apparatus 101-2 decrypts the wireless communication path with the second encryption key to obtain the image data.

If, on the other hand, direct communication is not possible ("NO" in Step S502), the procedure advances to Step S505. In Step S505, the communication apparatus 101-2 accesses the specified location where the image data to be shared is stored. Specifically, the communication apparatus 101-2 accesses the server 103 by using the URL information and IP address of the server 103. Subsequently, in Step S506, the communication apparatus 101-2 determines whether or not there is image data transmitted by the communication apparatus 101-1 on the server 103.

If there is image data transmitted by the communication apparatus 101-1 on the server 103 ("YES" in Step S506), the procedure advances to Step S507. In Step S507, the communication apparatus 101-2 determines whether or not the first encryption key shared with the communication apparatus 101-1 in the communication parameter setting process is valid. As used herein, "valid" means that the key can be used (the key is not discarded, or in other words, it is the correct encryption key).

If the first encryption key is invalid ("NO" in Step S507), the communication apparatus 101-2 informs the user that an error has occurred in the process by means of a UI or the like, and the process ends. If, on the other hand, the first encryption key is valid ("YES" in Step S507), in Step S508, the communication apparatus 101-2 downloads the image data. Because the downloaded image data is encrypted, in Step S509, the communication apparatus 101-2 decrypts the image data by using the first encryption key and acquires the original image data.

As described thus far, according to Embodiment 1, the first encryption key that was used to share a communication parameter in the communication parameter setting process is stored. When transmitting content data to an external apparatus, such as a server, that is connected to a network that is different from the wireless network configured by using the communication parameter, the first encryption key is used to encrypt the content data. Because the first encryption key is information that only communication apparatuses that have performed the communication parameter setting process can recognize, even when content data is temporarily uploaded to an external apparatus, it is possible to effectively prevent outsiders from intrusively viewing the content data.

Embodiment 2

Figure 6:
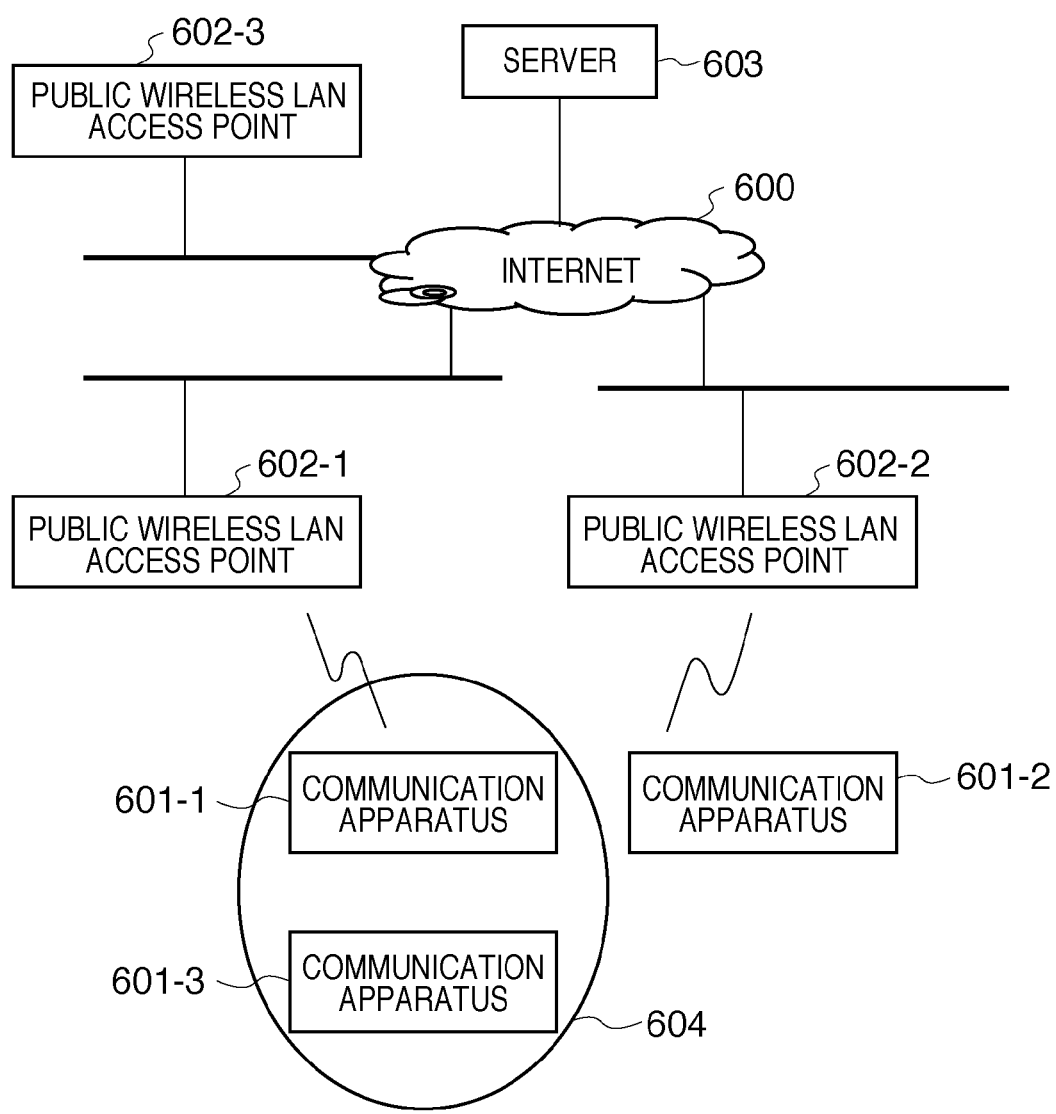
FIG. 6 is a diagram showing an example of a configuration of a data sharing system according to Embodiment 2 of the present invention.

Embodiment 2 of the present invention will be described below. FIG. 6 is a diagram showing an example of a configuration of a data sharing system according to Embodiment 2 of the present invention. An internet 600 is a network that enables communication between nodes in accordance with TCP/IP protocols. The internet 600 is not limited to the Internet, and can be a WAN (Wide Area Network), a LAN (Local Area Network), or a combination thereof.

Communication apparatuses 601-1, 601-2 and 601-3 are communication apparatuses that carry out wireless communication via a public wireless LAN access point (hereinafter referred to as an access point) 602-1, 602-2 or 602-3. Hereinafter, a plurality of communication apparatuses are collectively referred to as communication apparatuses 601, and a plurality of access points are collectively referred to as access points 602. Each communication apparatus 601 has an automatic communication parameter setting function to configure a wireless network.

In the present embodiment, the communication apparatus 601-1 is assumed to have the authority to connect to the access point 602-1, and store a communication parameter for connecting to the infrastructure-mode wireless network formed by the access point 602-1. The communication apparatus 601-2 is assumed to have the authority to connect to the access point 602-2, and store a communication parameter for connecting to the infrastructure-mode wireless network formed by the access point 602-2. The communication apparatus 601-3 is assumed to have the authority to connect to the access point 602-3, and store a communication parameter for connecting to the infrastructure-mode wireless network formed by the access point 602-3. The number of communication apparatuses 601 is not limited to three as shown in FIG. 6, and more communication apparatuses may be connected to the access points. In such a case, it is needless to say that each communication apparatus can connect to any access point as long as it has the authority, and the same results can be obtained.

The access points 602 are access points that are connected to the internet 600. The access points 602 provide a wireless LAN communication connection function to each communication apparatus. The number of access points 602 is not limited to three as shown in FIG. 6, and more access points may be connected to the internet 600. In addition, in the present embodiment, a description will be given in the context in which the communication apparatus 601 is connected to the internet 600 by being connected to the access point 602, but the communication apparatus 601 may be connected to the internet 600 via a public network such as a cell phone network.

A server 603 is connected to the internet 600, and content data, such as image data, transmitted from the communication apparatus 601 via the internet 600 is stored on the server 603. A network 604 is an ad hoc network configured by the communication apparatus 601-1 and the communication apparatus 601-3 through communication parameter setting. The communication apparatuses 601-1 and 601-3 can carry out direct communication via the network 604. The number of communication apparatuses 601 that configure such an ad hoc network is not limited to two, and the ad hoc network may be configured by three or more communication apparatuses 601.

The hardware configuration and functional module configuration of the communication apparatuses 601 of the present embodiment are the same as those of Embodiment 1 that were described with reference to FIGS. 2 and 3, so a description thereof is omitted here.

Next, an overview of a process according to the present embodiment will be described. In the present embodiment, first, automatic communication parameter setting for forming an ad hoc network among the communication apparatuses 601 is performed. In the automatic setting, the server 603 information is also shared among the communication apparatuses 601. After communication parameter setting, the communication apparatus 601-1 and the communication apparatus 601-3 carry out an ad hoc connection by using a shared communication parameter to form an ad hoc network 604. The communication apparatus 601-2 does not participate in the ad hoc network 604, and connects to the wireless network formed by the access point 602-2.

When the ad hoc connection between the communication apparatus 601-1 and the communication apparatus 601-3 ends, an ad hoc disconnecting process is performed to release the network 604. After that, the communication apparatus 601-1 connects to the access point 602-1. The communication apparatus 601-3 connects to the access point 602-3.

Hereinafter, an example will be described in which a communication apparatus 601 transmits image data to the server 603 via the internet 600, and another communication apparatus 601 receives the image data stored in the server 603. More particularly, in the present embodiment, an example will be described in which the communication apparatus 601-1 uploads image data to the server 603, and the communication apparatus 601-2 or 601-3 downloads the image data from the server 603. The communication apparatus 601-1 of the present embodiment is characterized in that, when transmitting image data, it performs encryption that can be decrypted by the communication apparatus 601-2 and 601-3 and encryption that can be decrypted only by the communication apparatus 601-3, whereby the communication apparatuses that can view the image data can be grouped. A configuration is also possible in which the communication apparatus 601-1 serves as an image data receiving side apparatus, and the communication apparatus 601-2 or 601-3 serves as an image data transmitting side apparatus.

In the present embodiment, an example will be described in which WPS (Wi-Fi Protected Setup) is applied to an ad hoc mode in the communication parameter setting process. In addition, in the present embodiment, a description will be given in the context in which the communication apparatus 601 is connected to the internet 600 by being connected to the access point 602, but the communication apparatus 601 may be connected to the internet 600 via a public network such as a cell phone network.

Next, an example of a process performed by the communication apparatus 601 according to the present embodiment will be described with reference to FIG. 7. More particularly, here, a process performed by the communication apparatus 601-1 serving as an image data transmitting side apparatus will be described. FIG. 7 is a flowchart showing an example of a process performed by the communication apparatus 601-1 according to the present embodiment.

In Step S701, the communication apparatus 601-1 determines whether or not a communication parameter setting process has commenced. In the present embodiment, whether or not WPS has commenced is determined. Next, in Step S702, the communication apparatus 601-1 determines whether or not there is a collaborative communication apparatus with which communication parameter setting is performed. In this example, because the communication apparatus 601-1 is an apparatus that executes this process, the communication apparatuses 601-2 and 601-3 are collaborative communication apparatuses. In Step S702, the presence or absence of a collaborative communication apparatus can be determined by, for example, determining whether or not a beacon that includes information indicating that WPS is activated has been received. It is also possible to determine the presence or absence of a collaborative communication apparatus by transmitting a probe request and determining whether or not a probe response that includes information indicating that WPS is activated has been received.

If the collaborative communication apparatus 601-2 or 601-3 is not found ("NO" in Step S702), the communication apparatus 601-1 informs the user that no collaborative communication apparatus was found by means of a UI or the like. Then, in Step S703, the communication parameter setting process ends with an error. When the communication parameter setting process ends with an error, the communication apparatus 601-1 returns to the initial state of Step S701.

If, on the other hand, a collaborative communication is found ("YES" in Step S702), the procedure advances to Step S704. In Step S704, the communication apparatus 601-1 shares a first encryption key with the collaborative communication apparatus 601-2 or 601-3. Specifically, the first encryption key is shared by using the Diffie-Hellman key exchange algorithm. Here, the first encryption key is used for encryption and decryption when transmitting and receiving a variety of information, such as a communication parameter, in the communication parameter setting process.

Subsequently, in Step S705, the communication apparatus 601-1 shares the URL, IP address information and the like of the server with the communication apparatus 601-2 or 601-3. In the present embodiment, because image data is shared by placing the image data on the server 603, the URL information, IP address and the like of the server 603 are acquired. In the case where content data is shared via a data holding communication apparatus rather than the server 603, in Step S706, the address information (URL, IP address, etc.) of the data holding communication apparatus is shared.

Subsequently, in Step S707, the communication apparatus 601-1 shares a communication parameter necessary to configure a wireless network with the communication apparatus 601-2 or 601-3. When a variety of information on a URL, a data holding communication apparatus, a communication parameter and so on is shared in Steps S705 to S707, the information is encrypted and decrypted with the first encryption key. In this example, Steps S705 to S707 were described as separate processes, but they may be performed collectively. That is, it is possible to store information on a URL, a data holding communication apparatus, a communication parameter and so on in a single frame, and transmit and receive the frame. In addition, the information on a URL and a data holding communication apparatus is not necessarily shared in the communication parameter setting process, and such information may be pre-stored in the communication apparatus 601-1 and the communication apparatus 601-2 or 601-3.

The first encryption key, the communication parameter, the URL of the server 603 and the address information of the data holding communication apparatus shared between the communication apparatuses 601 in the above process are stored in the storage unit 302. In Step S708, the communication apparatus 601-1 ends the communication parameter setting process. Next, in Step S709, the communication apparatus 601-1 determines whether or not an ad hoc network connection has been established based on the network determination unit 305. In the present embodiment, the communication apparatus 601-1 determines whether a wireless network connection has been established with at least either one of the communication apparatus 601-2 or the communication apparatus 601-3.

If an ad hoc network connection has been established ("YES" in Step S709), the procedure advances to Step S710. In Step S710, the communication apparatus 601-1 shares a second encryption key to be used for the ad hoc mode wireless communication with the collaborative communication apparatus and stores the second encryption key. The second encryption key to be shared includes a session key (a second encryption key for unicast communication) and a group key (a second encryption key for multicast communication) that were described in Embodiment 1.

Figure 8A:
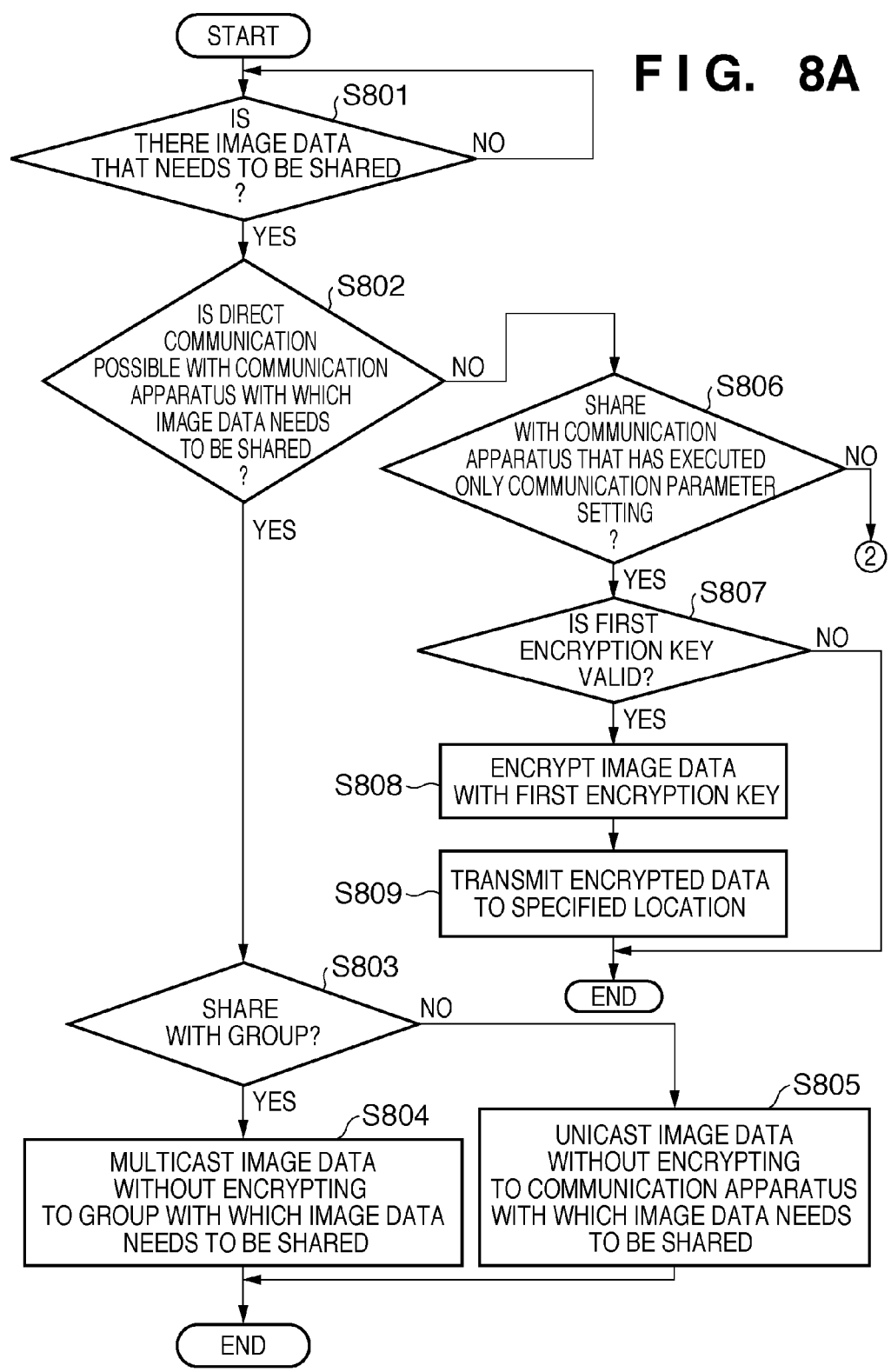
FIGS. 8A and 8B are flowcharts showing an example of a process for uploading image data performed by the communication apparatus 601-1 according to Embodiment 2 of the present invention.
Figure 8B:
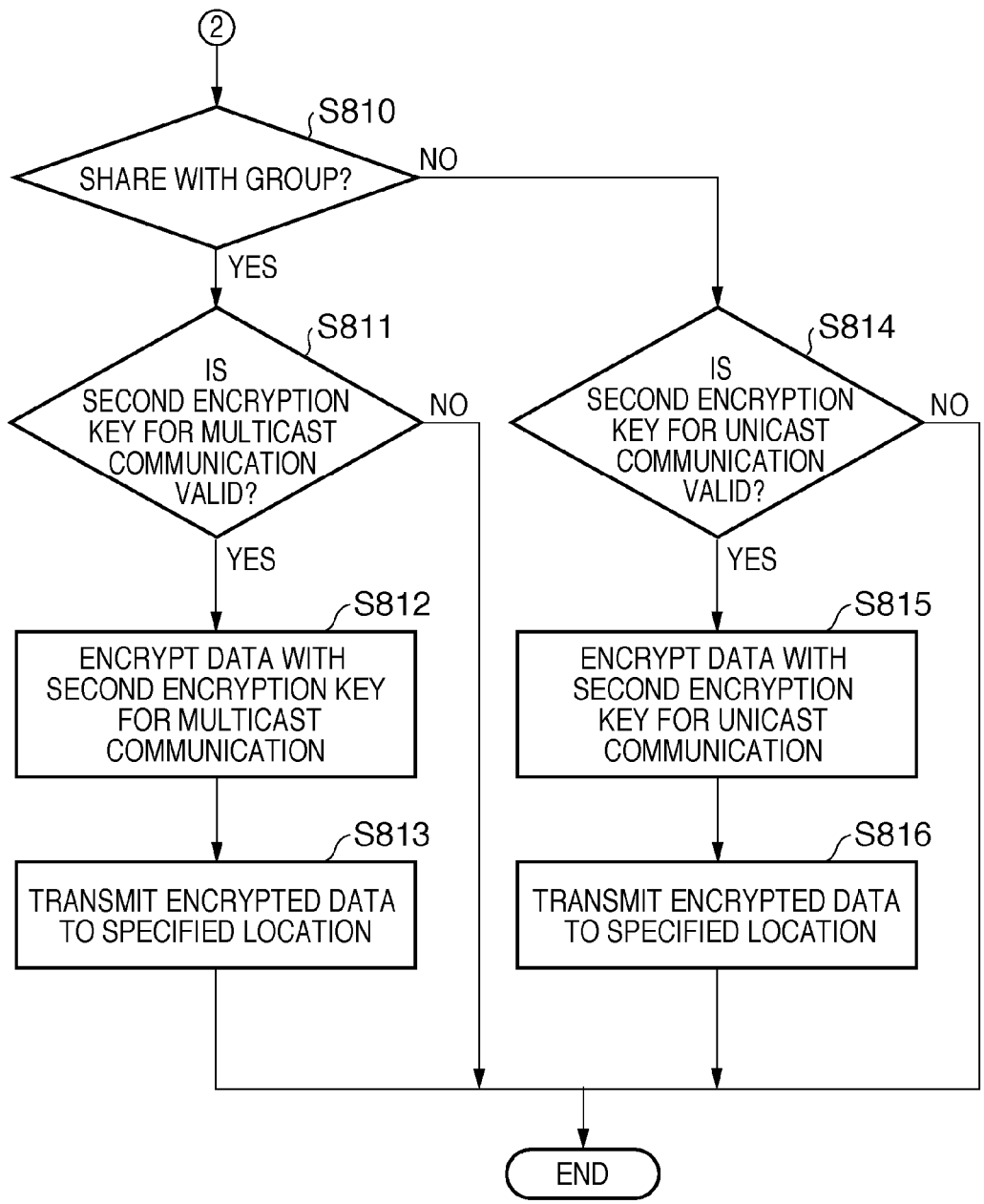

Next, a process performed when the communication apparatus 601-1 uploads image data to the server 603 by connecting to the access point 602-1 will be described with reference to FIGS. 8A and 8B. The process of FIGS. 8A and 8B can be executed anytime after a communication parameter setting process has been completed (after Step S708 of FIG. 7).

In Step S801, the communication apparatus 601-1 determines whether or not there is image data that needs to be shared with another communication apparatus. Such a determination can be made, for example, by a user selection or based on the fact that new image data has been added to the communication apparatus 601-1. If there is such image data ("YES" in Step S801), the procedure advances to Step S802.

In Step S802, the communication apparatus 601-1 determines whether or not direct communication is possible with the communication apparatus with which the image data needs to be shared. In the present embodiment, the communication apparatus with which the communication apparatus 601-1 wants to share image data is assumed to be the communication apparatus 601-2 or the communication apparatus 601-3. Whether or not direct communication is possible is determined by performing a detection process at the MAC layer within the network in which the communication apparatus resides to detect whether or not it is possible to discover another communication apparatus with which the image data needs to be shared. In the present embodiment, if the communication apparatus 601-1 is connected to a wireless network that employs a communication parameter shared in the communication parameter setting process, it is determined that direct communication is possible. That is, if the communication apparatus 601-1 is in an ad hoc network connection with the communication apparatus 601-2 or the communication apparatus 601-3, it is determined that direct communication is possible. If the communication apparatus 601-1 is connected to the access point 602-1, it is determined that direct communication is not possible.

If direct communication is possible ("YES" in Step S802), the procedure advances to Step S803, where the communication apparatus 601-1 determines whether the communication apparatus with which the image data needs to be shared is a group (plurality) of apparatuses or a single apparatus. Such a determination is made by, for example, determining whether a plurality of communication apparatuses have been selected or a single communication apparatus has been selected by a user operation. If a group of communication apparatuses have been selected ("YES" in Step S803), the procedure advances to Step S804. In Step S804, the communication apparatus 601-1 multicasts image data to the group of communication apparatuses with which the image data needs to be shared without encrypting the image data. In this case, the image data is transmitted via a wireless communication path encrypted with a group key (a second encryption key for multicast communication). If, on the other hand, the communication apparatus 601 with which the image data needs to be shared is a single apparatus ("NO" in Step S803), the procedure advances to Step S805. In Step S805, the communication apparatus 601-1 unicasts the image data to the single communication apparatus with which the image data needs to be shared without encrypting the image data. In this case, the image data is transmitted via a wireless communication path encrypted with a session key (a second encryption key for unicast communication). In this manner, when direct communication is possible, the wireless communication path is encrypted, and the data is transmitted without involving an intermediate apparatus such as a server and, thus, the image data is transmitted without being encrypted.

If it is determined in Step S802 that direct communication is not possible ("NO" in Step S802), the procedure advances to Step S806. In Step S806, the communication apparatus 601-1 determines whether or not the communication apparatus with which the image data needs to be shared is a communication apparatus that has executed only a communication parameter setting process. That is, it is determined whether or not to share the image data with another communication apparatus that has shared a communication parameter through a communication parameter setting process but that has not yet established a wireless network connection with the shared communication parameter. If the processes of Steps S709 and S710 of FIG. 7 have already been executed, the procedure advances to "NO" in Step S806. If the processes have not been executed, the procedure advances to "YES" in Step S806. Through this, an encryption key used to encrypt data is selected based on the determination in Step S806.

If the image data is shared with a communication apparatus that has executed only a communication parameter setting process ("YES" in Step S806), the procedure advances to Step S807, where it is determined whether or not the first encryption key is valid. As used herein, "valid" means that the key can be used (the key is not discarded, or in other words, it is the correct first encryption key). If the first encryption key is invalid ("NO" in Step S807), the communication apparatus 601-1 informs the user that an error has occurred in the process by means of a UI or the like, and the process ends.

If, on the other hand, the first encryption key is valid ("YES" in Step S807), in Step S808, the communication apparatus 601-1 encrypts the image data with the first encryption key.

In this manner, in the present embodiment as well, the first encryption key used to transmit and receive a communication parameter in the communication parameter setting process is also used to encrypt content data itself when transmitting the content data. When encrypting content data itself, it is not necessary to encrypt a communication path at an upper layer by SSL or the like, but if tighter security is necessary, the communication path at an upper layer may be encrypted. Whether or not to encrypt the communication path at an upper layer may be selectively switched by the user depending on which of communication speed or security is more important.

Subsequently, in Step S809, the communication apparatus 601-1 transmits the image data encrypted with the first encryption key to the server 603 based on the URL, IP address information and the like of the server 603. At this time, in order to enable a determination as to whether or not the communication apparatus 601-2 or the communication apparatus 601-3 can decrypt the image data transmitted to the server 603, the data frame may be associated with the identification information of an encryption key with which decryption is possible. When the transmission has been completed, the process ends.

In the present embodiment, the ad hoc network 604 has already been formed between the communication apparatuses 601-1 and 601-3, but an ad hoc connection is not established with the communication apparatus 601-2. Meanwhile, because the first encryption key used to share a communication parameter is stored in both apparatuses, when it is necessary to share image data with the communication 601-2, the image data is encrypted with the first encryption key.

If it is determined that the communication apparatus with which the image data needs to be shared is a communication apparatus that has executed a wireless network connection after a communication parameter setting process ("NO" in Step S806), the procedure advances to Step S810. In Step S810, it is determined whether or not to share the image data with all communication apparatuses (a group) that have already configured the ad hoc network 604 (that have performed a connection process by using the acquired communication parameter in the communication parameter setting process).

If it is determined that the image data is to be shared with a group ("YES" in Step S810), the process advances to Step S811. If it is determined that the image data is to be shared with a single communication apparatus ("NO" in Step S810), the procedure advances to Step S814.

In Step S812, it is determined whether or not a group key (second encryption key for multicast communication) with which the group of communication apparatuses 601 can decrypt the data is valid. As used herein, "valid" means that the key can be used (the key is not discarded, or in other words, it is the correct group key). If the group key is invalid ("NO" in Step S811), the communication apparatus 601-1 informs the user that an error has occurred in the process by means of a UI or the like, and the process ends. If the group key is valid ("YES" in Step S811), the procedure advances to Step S812, where the communication apparatus 601-1 encrypts the image data with the group key.

Subsequently, in Step S813, the communication apparatus 601-1 transmits the image data encrypted with the group key to the server 603 based on the URL, IP address information and the like of the server 603.

In Step S814, it is determined whether or not a session key (second encryption key for unicast communication) with which the single communication apparatus (in the present embodiment, the communication apparatus 601-3) can decrypt the data is valid. As used herein, "valid" means that the key can be used (the key is not discarded, or in other words, it is the correct session key). If the session key is invalid ("NO" in Step S814), the communication apparatus 601-1 informs the user that an error has occurred in the process by means of a UI or the like, and the process ends. If the session key is valid ("YES" in Step S814), the procedure advances to Step S815, where the communication apparatus 601-1 encrypts the image data with the session key with which the communication apparatus 601-3 with which the image data needs to be shared can decrypt the data.

Subsequently, in Step S816, the communication apparatus 601-1 transmits the image data encrypted with the session key to the server 603 based on the URL, IP address information and the like of the server 603. At this time, in order to enable a determination as to whether or not the communication apparatus 601-3 with which the image data is shared can decrypt the image data, the data frame may be associated with the identification information of an encryption key with which decryption is possible.

Next, the operations of the communication apparatus 601-2 and the communication apparatus 601-3 will be described with reference to FIG. 9.

In the present embodiment, it is assumed that the communication apparatus 601-2 has performed the processes spanning from Step S701 to Step S708 of FIG. 7 before Step S901 of FIG. 9, and the communication apparatus 601-3 has performed the processes spanning from Step S701 to Step S710.

The communication apparatus 601-2 or 601-3 determines in Step S901 whether or not to download data. The determination is made by, for example, a user selection. If it is determined that data is to be downloaded ("YES" in Step S901), the procedure advances to Step S902. In Step S902, the communication apparatus 601-2 or 601-3 determines whether or not direct communication is possible with the image data transmitting apparatus. In the present embodiment, the data transmitting apparatus is the communication apparatus 601-1. Whether or not direct communication is possible is determined by performing a detection process at the MAC layer within the network in which the communication apparatus 601-2 or 601-3 resides to detect whether or not it is possible to discover a data transmitting apparatus (the communication apparatus 601-1). In the present embodiment, if the communication apparatus 601-2 or 601-3 is connected to a wireless network that employs a communication parameter shared in the communication parameter setting process, it is determined that direct communication is possible. That is, if the communication apparatus 601-2 or 601-3 has an ad hoc network connection with the communication apparatus 601-1, it is determined that direct communication is possible. If the communication apparatus 601-2 or 601-3 is connected to the access point 602-2 or 602-3, it is determined that direct communication is not possible.

If direct communication is not possible ("YES" in Step S902), the procedure advances to Step S905. If direct communication is possible ("NO" in Step S902), the procedure advances to Step S903.

In Step S903, the communication apparatus 601-2 or 601-3 transmits an image data request to the data transmitting apparatus (communication apparatus 601-1) and receives the corresponding image data from the communication apparatus 601-1. As described above, when direct communication is carried out, the wireless communication path is encrypted with a session key or a group key, and the image data itself is not encrypted. Accordingly, the communication apparatus 601-2 or 601-3 decrypts the wireless communication path with the second encryption key to obtain the image data. In Step S904, it is determined whether or not the reception of image data has been completed. If reception has been completed ("YES" in Step S904), the process ends.

In Step S905, the communication apparatus 601-2 or 601-3 accesses the server 603 based on the URL, IP address information and the like of the server 603.

In Step S906, the communication apparatus 601-2 or 601-3 determines whether or not there is image data transmitted by the communication apparatus 601-1 on the server 603. If there is image data transmitted by the communication apparatus 601-1 in the server 603 ("YES" in Step S906), the procedure advances to Step S907. If the image data is not found ("NO" in Step S1006), the communication apparatus 601-2 or 601-3 informs the user of the fact by means of a UI or the like, and the process ends.

Subsequently, in Step S907, the communication apparatus 601-2 or 601-3 determines whether or not the encryption key shared with the communication apparatus 601-1 is valid. As used herein, "valid" means that the key can be used (the key is not discarded, or in other words, it is the correct encryption key). In the present embodiment, the communication apparatus 601-2 confirms whether or not the first encryption key is valid. As for the communication apparatus 601-3, because it has the first encryption key (shared in the communication parameter setting process) and the second encryption key (shared when configuring a wireless network), it determines whether or not the encryption key necessary to decrypt the data is valid.

If the encryption key necessary to decrypt the data is invalid ("NO" in Step S907), the user is informed that an error has occurred in the process by means of a UI or the like, and the process ends. If, on the other hand, the encryption key is valid ("YES" in Step S907), in Step S1008, the image data is downloaded from the server 603.

Because the downloaded image data is encrypted, in Step S909, the communication apparatus 601-2 or 601-3 decrypts the image data by using the corresponding encryption key and acquires the original image data. In the present embodiment, the communication apparatus 601-1 has transmitted, to the server 603, the image data encrypted with the first encryption key to share the data with the communication apparatus 601-2 and the image data encrypted with the second encryption key to share the data with the communication apparatus 601-3. Accordingly, the communication apparatus 601-2 can acquire the original image data by decrypting the image data by using the first encryption key. On the other hand, the communication apparatus 601-3 can decrypt the image data by using either the first encryption key or the second encryption key because the communication apparatus 601-3 has both the first encryption key and the second encryption key.

As described thus far, according to Embodiment 2, in addition to the first encryption key, the second key used to encrypt a wireless communication path in a wireless network configured by using a communication parameter shared in a communication parameter setting process is also stored. When transmitting content data to an external apparatus, such as a server, that is connected to a network that is different from the wireless network configured by using the communication parameter, the first encryption key or the second encryption key is used to encrypt the content data. At this time, which one of the first and second encryption keys is to be used can be switched depending on whether or not a wireless network connection using the shared communication parameter has already been performed, whereby it is possible to change the specific target communication apparatus with which content data is to be shared for each item of content data. In addition, the encryption key used is information that only a communication apparatus with which content data is to be shared can recognize, even when content data is temporarily uploaded to an external apparatus, it is possible to effectively prevent unknown users from intrusively viewing the content data.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-264633, filed on Oct. 10, 2008, and No. 2009-222840, filed on Sep. 28, 2009, which are hereby incorporated by reference herein in their entirety.

What is claimed is:

1. A communication apparatus comprising:
 a communication unit configured to communicate with another communication apparatus via a wireless network;
 a sharing unit configured to execute a communication-parameter-setting-processing operation to share a communication parameter used in the wireless network;
 a storage unit configured to store at least one of (i) a first encryption key for encrypting the communication parameter shared in the communication-parameter-setting-processing operation and (ii) a second encryption key for encrypting communication based on the communication parameter shared by said sharing unit;
 an encryption unit configured to encrypt data using the first encryption key or the second encryption key stored in said storage unit;
 a transmitting unit configured to transmit the data encrypted by said encryption unit to an external apparatus via another network different from the wireless network, so that the other communication apparatus can acquire the data encrypted by the encryption unit from the external apparatus; and
 a first determination unit configured to determine whether or not said communication apparatus is connected to the other communication apparatus via the wireless network configured using the communication parameter shared by said sharing unit, wherein said encryption unit is further configured to switch between whether or not to encrypt the data according to a result of a determination made by said first determination unit, and wherein said transmitting unit is further configured to transmit the data to the other communication apparatus via the wireless network, without encrypting the data using said encryption unit, in a case where said first determination unit has determined that said communication apparatus is connected to the other communication apparatus via the wireless network, and to transmit the data encrypted by said encryption unit to the external apparatus, in a case where the first determination unit has determined that said communication apparatus is not connected to the other communication apparatus via the wireless network.

2. The communication apparatus according to claim 1, further comprising a second determination unit configured to determine whether or not the wireless network connection has already been established, using the communication parameter shared by said sharing unit, with the other communication apparatus with which the data is to be shared, wherein which of the first encryption key and the second encryption key is to be used for the encryption of the data in said encryption unit is selected according to a result of a determination made by said determination unit.

3. The communication apparatus according to claim 1, wherein the second encryption key is an encryption key that is used to encrypt a wireless communication path of the wireless network configured using the communication parameter shared by said sharing unit.

4. The communication apparatus according to claim 1, wherein the second encryption key is at least one of a session key that is used when transmitting to a single partner apparatus in the wireless network configured using the communication parameter shared by said sharing unit and a group key that is used when transmitting to a plurality of partner apparatuses.

5. The communication apparatus according to claim 1, wherein the external apparatus is a server that is connected to an external network that is capable of communication via the base station.

6. A communication apparatus comprising:
a communication unit configured to communicate with another communication apparatus via a wireless network;
a sharing unit configured to execute a communication-parameter-setting-processing operation to share a communication parameter used in the wireless network;
a storage unit configured to store at least one of (i) a first encryption key for encrypting the communication parameter shared in the communication-parameter-setting-processing operation and (ii) a second encryption key for encrypting communication based on the communication parameter shared by said sharing unit;
a receiving unit configured to receive first data encrypted by the other communication apparatus, via another network different from the wireless network, from an external apparatus which stores the encrypted data;
a decryption unit configured to decrypt the encrypted first data received by said receiving unit using the first encryption key or the second encryption key stored in said storage unit; and
a determination unit configured to determine whether or not said communication apparatus is connected to the other communication apparatus via the wireless network configured using the communication parameter shared by said sharing unit, wherein said decryption unit is further configured to switch between whether or not to decrypt data received from the other communication apparatus according to a result of a determination made by said determination unit, and wherein said receiving unit is further configured to receive second data from the other communication apparatus via the wireless network, without decrypting the second data using said decryption unit, in a case where said determination unit has determined that said communication apparatus is connected to the other communication apparatus via the wireless network, and to receive the first data encrypted by the other communication apparatus from the external apparatus, in a case where the determination unit has determined that said communication apparatus is not connected to the other communication apparatus via the wireless network.

7. A method for a communication apparatus, wherein the communication apparatus comprises a processor and a memory storing a program executable by the processor and the program includes computer code for implementing said method, comprising:
a communication step of communicating with another communication apparatus via a wireless network;
a sharing step of executing a communication-parameter-setting-processing operation to share a communication parameter used in the wireless network;
a storage step of storing at least one of (i) a first encryption key for encrypting the communication parameter shared in the communication-parameter-setting-processing operation and (ii) a second encryption key for encrypting communication based on the communication parameter shared in said sharing step;
an encryption step of encrypting data using the first encryption key or the second encryption key stored in said storage step;
a transmitting step of transmitting the data encrypted in said encryption step to an external apparatus via another network different from the wireless network, so that the other communication apparatus can acquire the data encrypted in said encryption step from the external apparatus; and
a first determination step of determining whether or not said communication apparatus is connected to the other communication apparatus via the wireless network configured using the communication parameter shared in said sharing step, wherein said encryption step further includes switching between whether or not to encrypt the data according to a result of a determination made in said first determination step, and wherein said transmitting step further includes transmitting the data to the other communication apparatus via the wireless network, without encrypting the data in said encryption step, in a case where it is determined in said first determination step that said communication apparatus is connected to the other communication apparatus via the wireless network, and transmitting the data encrypted in said encryption step to the external apparatus, in a case where it is determined in said first determination step that said communication apparatus is not connected to the other communication apparatus via the wireless network.

8. A method for a communication apparatus, wherein the communication apparatus comprises a processor and a memory storing a program executable by the processor and the program includes computer code for implementing said method, comprising:
- a communication step of communicating with another communication apparatus via a wireless network;
- a sharing step of executing a communication-parameter-setting-processing operation to share a communication parameter used in the wireless network;
- a storage step of storing at least one of (i) a first encryption key for encrypting the communication parameter shared in the communication-parameter-setting-processing operation and (ii) a second encryption key for encrypting communication based on the communication parameter shared in said sharing step;
- a receiving step of receiving first data encrypted by the other communication apparatus, via another network different from the wireless network, from an external apparatus which stores the encrypted data;
- a decryption step of decrypting the encrypted first data received in said receiving step using the first encryption key or the second encryption key stored in said storage step; and
- a determination step of determining whether or not said communication apparatus is connected to the other communication apparatus via the wireless network configured using the communication parameter shared in said sharing step,
- wherein said decryption step further includes switching between whether or not to decrypt data received from the other communication apparatus according to a result of a determination made in said determination step, and
- wherein said receiving step further includes receiving second data from the other communication apparatus via the wireless network, without decrypting the second data in said decryption step, in a case where it is determined in said determination step that said communication apparatus is connected to the other communication apparatus via the wireless network, and receiving the first data encrypted by the other communication apparatus from the external apparatus, in a case where it is determined in said determination step that said communication apparatus is not connected to the other communication apparatus via the wireless network.

9. A non-transitory computer-readable memory having stored thereon sequences of instructions which when executed by a communication apparatus cause the communication apparatus to execute a communication method, said method comprising:
- a communication step of communicating with another communication apparatus via a wireless network;
- a sharing step of executing a communication-parameter-setting-processing operation to share a communication parameter used in the wireless network;
- a storage step of storing at least one of (i) a first encryption key for encrypting the communication parameter shared in the communication-parameter-setting-processing operation and (ii) a second encryption key for encrypting communication based on the communication parameter shared in said sharing step;
- an encryption step of encrypting data encrypted using the first encryption key or the second encryption key stored in said storage step;
- a transmitting step of transmitting the data encrypted in said encryption step to an external apparatus via another network different from the wireless network, so that the other communication apparatus can acquire the data encrypted in said encryption step from the external apparatus; and
- a first determination step of determining whether or not said communication apparatus is connected to the other communication apparatus via the wireless network configured using the communication parameter shared in said sharing step,
- wherein said encryption step further includes switching between whether or not to encrypt the data according to a result of a determination made in said first determination step, and
- wherein said transmitting step further includes transmitting the data to the other communication apparatus via the wireless network, without encrypting the data in said encryption step, in a case where it is determined in said first determination step that said communication apparatus is connected to the other communication apparatus via the wireless network, and transmitting the data encrypted in said encryption step to the external apparatus, in a case where it is determined in said first determination step that said communication apparatus is not connected to the other communication apparatus via the wireless network.

10. A non-transitory computer-readable memory having stored thereon sequences of instructions which when executed by a communication apparatus cause the communication apparatus to execute a communication method, said method comprising:
- a communication step of communicating with another communication apparatus via a wireless network;
- a sharing step of executing a communication-parameter-setting-processing operation to share a communication parameter used in the wireless network;
- a storage step of storing at least one of (i) a first encryption key for encrypting the communication parameter shared in the communication-parameter-setting-processing operation and (ii) a second encryption key for encrypting communication based on the communication parameter shared in said sharing step;
- a receiving step of receiving data encrypted by the other communication apparatus, via another network different from the wireless network, from an external apparatus which stores the encrypted data;
- a decryption step of decrypting the encrypted first data received in said receiving step using the first encryption key or the second encryption key stored in said storage step; and
- a determination step of determining whether or not said communication apparatus is connected to the other communication apparatus via the wireless network configured using the communication parameter shared in said sharing step,
- wherein said decryption step further includes switching between whether or not to decrypt data received from the other communication apparatus according to a result of a determination made in said determination step, and
- wherein said receiving step further includes receiving second data from the other communication apparatus via the wireless network, without decrypting the second data in said decryption step, in a case where it is determined in said determination step that said communication apparatus is connected to the other communication apparatus via the wireless network, and receiving the first data encrypted by the other communication apparatus from the external apparatus, in a case where it is determined in said determination step that said communication apparatus is not connected to the other communication apparatus via the wireless network.

11. The communication apparatus according to claim 1, wherein
the wireless network is a network that allows the communication apparatus to directly communicate with the other communication apparatus without any intermediate apparatuses.

\* \* \* \* \*